United States Patent [19]

Abels

[11] 4,137,990
[45] Feb. 6, 1979

[54] STEERING ASSEMBLY FOR A FLOOR-TYPE INDUSTRIAL VEHICLE WITH IMPROVED MOUNTING MEANS

[75] Inventor: Theodor Abels, Aschaffenburg, Fed. Rep. of Germany

[73] Assignee: Linde AG, Wiesbaden, Fed. Rep. of Germany

[21] Appl. No.: 836,850

[22] Filed: Sep. 26, 1977

[30] Foreign Application Priority Data

Sep. 24, 1976 [DE] Fed. Rep. of Germany ....... 2642902

[51] Int. Cl.² .............................................. B62D 5/06
[52] U.S. Cl. ..................................... 180/155; 280/111
[58] Field of Search .............. 180/154, 155, 156, 157, 180/158, 159, 133; 280/111, 112 R

[56] References Cited

U.S. PATENT DOCUMENTS

| | | | |
|---|---|---|---|
| 3,506,079 | 4/1970 | Madler | 280/111 |
| 3,702,196 | 11/1972 | Krutis | 280/111 |
| 3,768,585 | 10/1973 | Matteo | 180/154 |
| 4,046,218 | 9/1977 | Blaisdell | 280/111 |

Primary Examiner—Joseph F. Peters, Jr.
Assistant Examiner—R. Schrecengost
Attorney, Agent, or Firm—Karl F. Ross

[57] ABSTRACT

A steering assembly for a floor-type industrial vehicle, for example, a fork-lift truck, which comprises an elongated axle body to which the steerable wheel axles are affixed by pivotal axle carriers at the ends of the axle body and a steering linkage is mounted on the axle body for displacing the wheels. The axle assembly is at least limitedly swingable on the vehicle frame by a mounting assembly which comprises a pair of ball joints whose centers lie in the vertical median plane of the vehicle and transverse to the axle assembly.

8 Claims, 4 Drawing Figures

STEERING ASSEMBLY FOR A FLOOR-TYPE INDUSTRIAL VEHICLE WITH IMPROVED MOUNTING MEANS

CROSS-REFERENCE TO RELATED APPLICATIONS

The present application is related to the commonly assigned, copending, concurrently filed applications Ser. No. 836,847, Ser. No. 836,849 and Ser. No. 836,851, respectively.

FIELD OF THE INVENTION

The present invention relates to a steering axle assembly for an industrial-type vehicle and, more particularly, to a steering assembly for a floor-type industrial vehicle and especially a fork-lift truck.

BACKGROUND OF THE INVENTION

It has been proposed heretofore to provide a steering axle assembly for an industrial-type vehicle, especially a floor vehicle such as a fork-lift truck, with an elongated axle body which is secured to the vehicle frame or chassis with at least limited pivotal mobility about an axis lying in the vertical longitudinal median plane of the vehicle and transverse to the axle body.

In general, a pair of wheel axles are pivotally mounted at the opposite ends of this body and are connected to a steering linkage which swings these wheels. This steering linkage can include a pivot for a knuckle which can be connected by respective tie bars to axle carriers each of which has a respective wheel-carrying axle fixed thereto.

A hydraulic-cylinder arrangement may be provided to displace this linkage.

Such systems have been found to be effective in providing a relatively small turning radius as is necessary for the high maneuverability required for floor vehicles such as fork-lift trucks.

The limited swingability of the axle body is important to permit the axle assembly to adjust to irregularities in the floor or ground surface over which the vehicle travels even where the wheels of the vehicle carry elastic, i.e. pneumatic tires.

Conventional axle assemblies for the steerable wheel of a vehicle generally comprise a pair of journal blocks which mount the axle assembly upon the vehicle frame or chassis, these journal blocks having aligned bores parallel to the longitudinal axis of the vehicle and hence perpendicular to the longitudinal dimension of the axle body.

A pivot bolt or pin traverses these bores and permits the axle body to swing about the axis of the pin or bolt and hence with limited mobility about an axis parallel to the longitudinal axis of the vehicle.

This mounting assembly applies the vertical loading forces of the vehicle to the axle assembly.

Since the axle assembly must also be subjected to the braking forces and forces resulting from the rolling resistance, it is subjected to shocks of various type during normal operations and when the vehicle wheels are partly or wholly blocked or encounter irregularities.

The journal blocks must thus be provided with sliding surfaces capable of absorbing forces parallel to the axis of the pivot pin or bolt in both directions. These forces produce moments which are, in turn, transferred to the bolt or pivot pin.

Conventional assemblies of this type have not been found to be fully successful in absorbing all of these various forces and shocks in a reliable manner.

In addition, the linkage between the axle body and the vehicle body or chassis is relatively expensive, requires considerable labor in mounting and repair, and also involves considerable work in adjusting the mounting arrangement to exclude undesired play.

OBJECTS OF THE INVENTION

It is the principal object of the present invention to provide an axle assembly for the steerable wheels of a vehicle, particularly a floor-type industrial vehicle such as a fork-lift truck, whereby the aforedescribed disadvantages are avoided.

Another object of the invention is to improve upon the mounting of a steering-axle assembly to a vehicle body or frame of the type described.

Still another object of this invention is to provide a steering-axle assembly of small height, adequate protection against external forces and low cost with improved mounting means for pivotally securing it with limited displaceability to the frame or chassis of a vehicle so that all of the forces which are applied to the axle assembly are readily taken up, mounting and adjustment costs are minimized, and the mounting assembly itself is of relatively low cost.

SUMMARY OF THE INVENTION

These objects and others which will become apparent hereinafter are attained, in accordance with the present invention by providing, in a steering-axle assembly of the type described, a mounting means for securing the axle body to the vehicle frame or chassis which comprises a pair of ball joints whose centers define a pivotal axis for the axle body which extends substantially perpendicular to the longitudinal dimension of this body and parallel to the longitudinal axis of the vehicle, i.e. in the vertical median plane of the vehicle perpendicular to the axle body. The ball joints are retained by a form-fitting securing plate which can be bolted to the underside of the ball socket receiving the balls of the joint and mounted upon the vehicle frame or chassis.

Thus the two ball heads of the ball joint can be affixed to the axle body which may be provided with forwardly and rearwardly extending lugs or eyes for this purpose, while the ball socket, into which each ball extends, is mounted on the vehicle frame or chassis.

Preferably, this socket-forming member and the aforementioned form-fitting ball-retaining member disposed below each ball head, i.e. the securing plate, can be premounted on the axle assembly and the entire axle assembly secured to the chassis or frame.

Alternatively, the frame can be provided with the ball sockets which can be loosely mounted thereon, whereupon these sockets can be positioned precisely by inserting the respective balls, premounted on the axle assembly, into the respective pockets and then tightening the securing plates therebelow.

The tightening of the assembly can be effected only after the ball heads have been loaded within the respective sockets, i.e. the full vehicle load has been applied to press the sockets over the balls.

The securing plates prevent the balls from dropping out of the socket and are constructed and arranged so that when the vehicle chassis or frame is lifted or blocked, the axle can be supported by these plates.

Advantageously, a sealing ring is provided around each of the ball joints between the respective plate and the axle body so that, upon mounting of the ball joints, a sufficient quantity of lubricant can be introduced and is retained by the sealing ring. The sealing ring also prevents contaminants from entering into the ball socket.

This construction has been found to minimize fabrication costs since it requires minimum work in attaching the socket to the vehicle chassis or frame and, in addition, permits limited pivoting movement of the vehicle axis about the axis defined by the centers of the two ball joints. In addition, the ball joints are capable of taking up forces in all directions and hence even forces which act parallel to this axis.

BRIEF DESCRIPTION OF THE DRAWING

The above and other objects, features and advantages of the present invention will become more readily apparent from the following description, reference made to the accompanying drawing in which.

SPECIFIC DESCRIPTION

Figure 1:
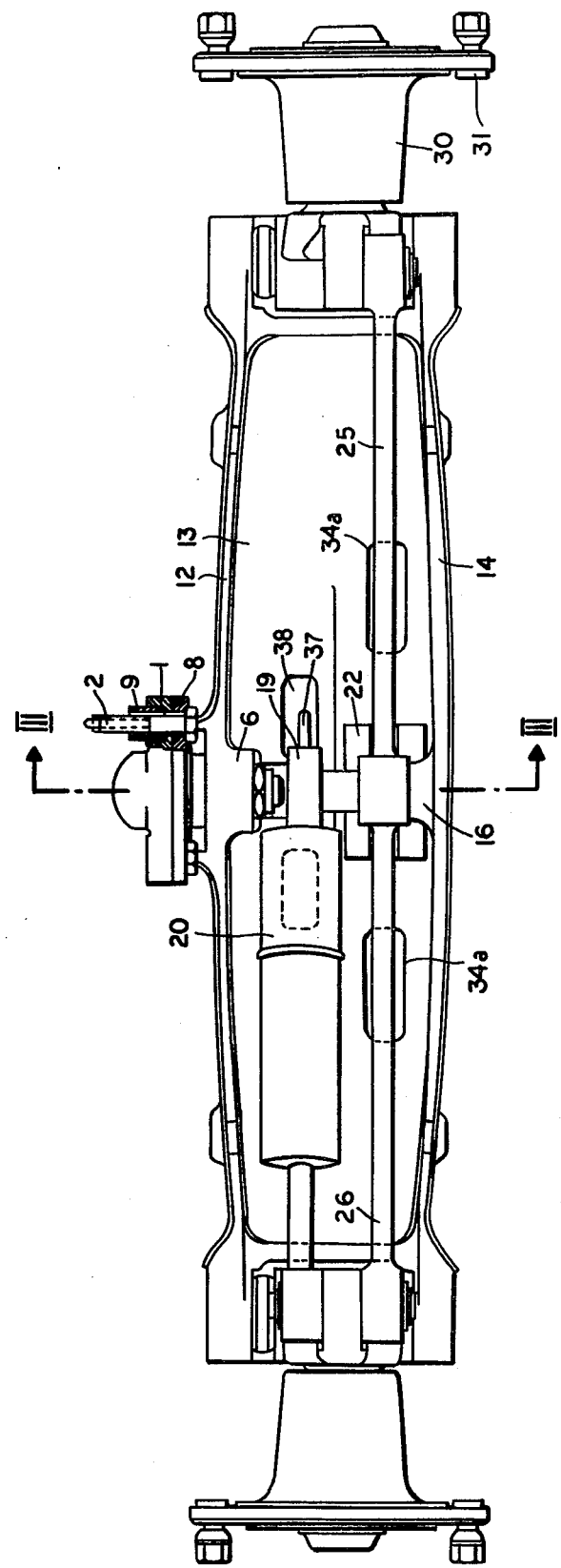
FIG. 1 is an elevational view of an axle assembly for the steerable wheels of a fork-lift truck as seen from the rear, partly broken away.

The axle assembly shown in FIGS. 1–4 is intended to be mounted upon the frame or chassis of a fork-lift truck or like industrial vehicle, the frame or chassis being unillustrated in the drawing.

More specifically, the axle assembly comprises a pair of mounting plates 1 which are intended to be affixed to the frame, not shown, of the vehicle. Each of the mounting plates 1 is formed with a ball-shaped receptacle 1a (see FIGS. 2 and 3) in which a ball head 3 is received. Each of the ball heads 3 has a pin 4 which extends through a projection 5 or 6 of the axle housing and is fixed thereto by a nut 7.

To prevent the ball heads 3 from pulling out of the sockets 1a of the mounting plates 1, below these ball heads there are provided form-fitting securing plates 8 which pass the ball members with clearance and are affixed from below to the vehicle frame. Stressing sleeves 9 ensure a firm connection between members 1 and 8. The balls are locked into place by the screws 2 only after, with the screws loose, the balls are forced by the vehicle weight on the axle assembly into the sockets. An elastic ring is disposed between each of the plates 8 and the housing lugs 5 and 6 to form a seal around the balls 3 as shown at 10 in FIG. 3.

The axle housing, which is formed with the forward projection or lug 5 and the rearward projection or lug 6 previously mentioned is represented generally at 100 and comprises an upper horizontal wall 12, a rear wall 13 and a lower wall 14. One side of the housing is thus open at 100a.

The rear wall 13 is formed at its lower central portion with an outward bulge 13a. In the vertical median plane through the housing, corresponding to the plane of the section line III—III, the upper wall 12 is formed with a downwardly extending boss 15 while the bottom wall 14 is formed with an upwardly extending boss 16. These bosses 15 and 16 are formed with aligned bores 17 into which a pivot pin 18 is press fitted.

A pivot pin 19 of a hydraulic cylinder 20, serving to displace the steering mechanism, is swingably mounted upon the pin 18.

Below the head 19, also upon this pin 18, there is provided a spacing sleeve 21 and below the spacing sleeve, the pivot head 22a of a steering knuckle or central member 22.

In the central member 22, by respective pivots 23 and 24, two tie bars 25 and 26 are mounted.

The tie bar is pivotally connected by a pin 29 to an axle carrier 28a upon which the right-hand axle 28 is affixed. The axle carrier 28a is pivotally connected by the pin 27 to the right-hand end of the axle housing 100. The axle 28, in addition, carries the wheel hub 30 to which, by screws 31, the felly or rim of the right-hand wheel can be affixed to this hub.

Similarly, the axle 3 carrying the hub 30 and the wheel bolts for the left-hand wheel is mounted upon an axle carrier which is pivoted at 27 to the housing and is connected by a pivot bolt or pin 33 with the tie bar 26.

The bolt or pin 33 is made somewhat longer than the bolt of pin 29 to accommodate the pivot head of the rod 35 of the hydraulic cylinder 20. Thus the hydraulic cylinder 20 acts upon the carrier for the left-hand wheel as can be seen from FIG. 2.

The working chamber on the piston rod side of this cylinder is connected via a line 36 which can be pressurized by any conventional steering control (not shown) for the fork-lift truck. The working chamber of the cylinder at the piston side is connected via a bore 36a with line 37 passing through a window 38 in the rear wall 13 of the axle housing 100.

The rear wall 13 is also formed with cutouts 34a to permit full displacement of the tie rods 25 and 26 and thus prevent these divided tie rod members from contacting the wall 13.

The axes of the pivot pins or bolts 18, 23, 24, 27, 29 and 33 are all paralel to one another, generally perpendicular to the walls 12 and 14 and substantially parallel to the wall 13. They are also substantially perpendicular to the plane of the tie bars 25 and 26.

From the drawing and the foregoing description, it will be apparent that the centers of ball joints 3 (FIG. 3) define an axis about which the entire axle assembly 100, etc., is capable of pivoting relative to the vehicle body to which the socket-forming members 1 are bolted. Thus, the axle assembly can pivot relative to the vehicle chassis or frame or the axis (longitudinal axis) of the vehicle can tilt about the axis defined by the centers of the ball joints 3. This facilitates movement of the vehicle along irregular ground and floor surfaces.

In addition, each of the sockets is provided with lubricant upon assembly, the lubricant being retained by the sealing ring 10 which is interposed between each of the ball-retaining plates 8 and the upper wall 12 of the axle housing around the shank 4 of each ball.

The axis defined by the centers of the balls 3 lies in a plane (parallel to the plane of the paper in FIG. 3) which corresponds to the section line III—III of FIG. 1. This plane also encompasses the axis of the pivot 18 of the knuckle 22 and the cylinder 20.

Figure 4:
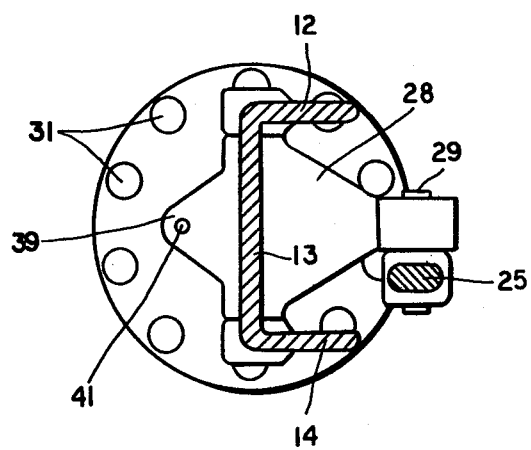
FIG. 4 is a cross-sectional view taken along the line IV—IV of FIG. 2.

As can be seen especially from FIG. 4, the tie bars 25 and 26 are of substantially rectangular cross section and constitute bodies of identical bending strength and stiffness. This has been found to be essential for effective utilization of the axle assembly of the present invention.

Each of the axle carriers 28a, 32a is provided with a projection 39 in which an adjusting screw 41 is threaded and locked in place by a counternut 40. The screw 41 sets the maximum angular displacement of the respective axle carriers about the pivots 27 and thus prevents the tires carried by the respective wheels from coming to rest against the rear wall 13 or, in the opposite direction, against the hydraulic cylinder 20.

Figure 2:
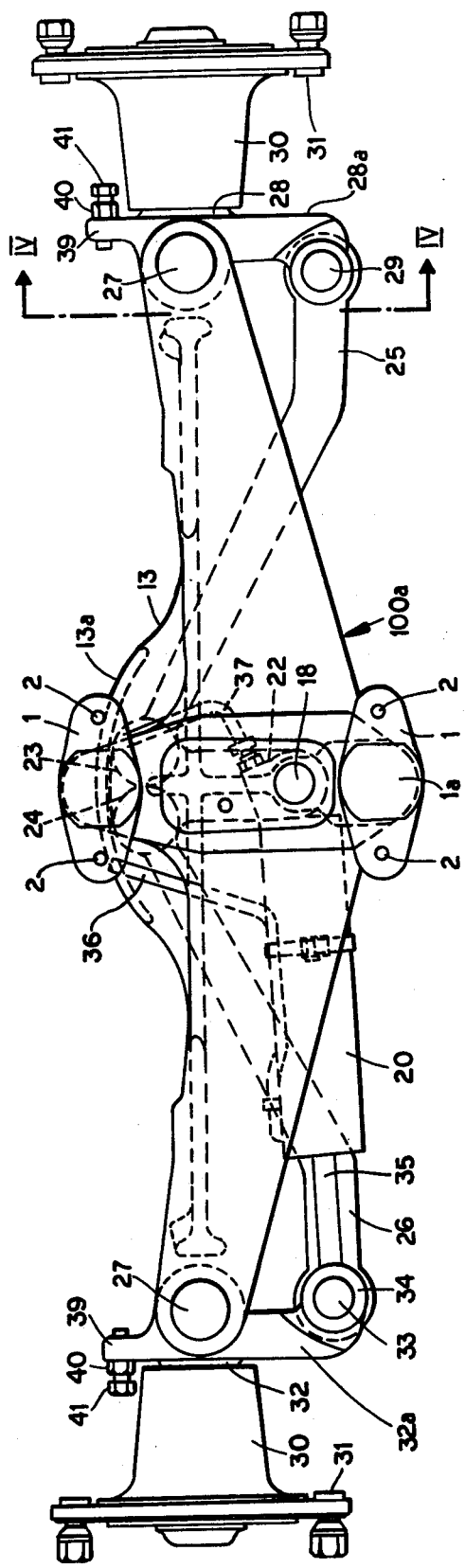
FIG. 2 is a plan view of the axle assembly.
Figure 3:
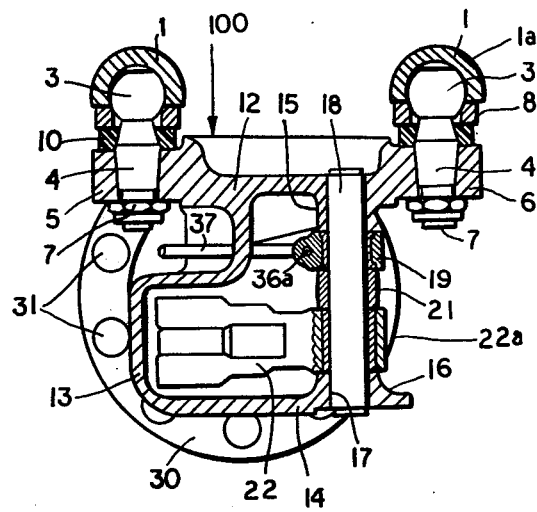
FIG. 3 is a cross-sectional view taken along the line III—III of FIG. 1.

It is important, as noted, that the members 25 and 26 have the same bending strength and stiffness in a plane corresponding to the plane of FIG. 2 and perpendicular to the plane of FIG. 1.

Furthermore, the pin 18 forms a common element supporting the knuckle 22 and the head 19 at the end of the cylinder 20 as that the pivots for the cylinder and for the knuckle are coaxial.

I claim:

1. A steering-axle assembly for a floor-type industrial vehicle, especially a fork-lift truck, comprising:
   an elongated axle body;
   a pair of wheel-carrying axles pivotally connected to said body at the ends thereof;
   a steering linkage on said body for displacing said axles angularly; and
   mounting means for securing said body to a vehicle chassis, said mounting means comprising at least two ball joints mounted on said body and having centers defining an axis affording relative angular displacement of said body and said chassis, each of said ball joints including
   a downwardly open ball socket adapted to be secured to said chassis,
   a respective ball mounted upon said body and received in each of said sockets, and
   a respective retaining plate engaging beneath said ball and holding same in the respective socket while suspending said axle body from said vehicle chassis.

2. The assembly defined in claim 1 wherein said steering linkage includes a pin mounted on said body substantially in a plane of said axis, a knuckle swingably mounted upon said pin, respective tie bars pivotally connected to said knuckle and each pivotally connected to one of said axles, and a hydraulic cylinder pivotally connected to said body and to one of said axles.

3. The assembly defined in claim 2 wherein said hydraulic cylinder is pivotally mounted on said pin and each of said axles is affixed to a respective axle carrier pivoted on a respective end of said body, the pivots of said carriers on said body, said tie bars to said carriers and said tie bars to said knuckle having axes parallel to the axis of said pin and perpendicular to the exis defined by the centers of said ball joints.

4. The assembly defined in claim 3 wherein said axle body is a generally C-section housing having an upper wall, a lower wall and a further wall bridging said upper and lower walls, said housing being open to one side, said pin, said knuckle and the major portions of said tie bars being received in said housing.

5. The assembly defined in claim 4 wherein said other wall is formed with a bulge opposite said pin, said knuckle reaching into said bulge.

6. The assembly defined in claim 5 wherein said upper wall is formed with a pair of forwardly and rearwardly extending lugs in said plane, said lugs each carrying a respective one of said balls.

7. The assembly defined in claim 6 wherein said cylinder is pivotally connected to one of said carriers coaxially with the pivotal connection of the respective tie bar thereto.

8. The assembly defined in claim 7 wherein said tie bars lie in a common plane parallel to the axis defined by the centers of said ball joints.

* * * * *